United States Patent [19]

Horsma et al.

[11] 4,095,044

[45] June 13, 1978

[54] MULTIPLE CABLE ADAPTER AND SPLICE CASE INCLUDING THE SAME

[75] Inventors: David August Horsma, Palo Alto, Calif.; Francis De Blauwe, Lubbeek, Belgium

[73] Assignee: Raychem Corporation, Menlo Park, Calif.

[21] Appl. No.: 735,587

[22] Filed: Oct. 26, 1976

[51] Int. Cl.² ...................... H02G 15/10; H02G 15/18
[52] U.S. Cl. ............................... 174/138 F; 174/77 R; 174/88 R; 174/92; 277/22; 277/26
[58] Field of Search ................ 174/21 R, 22 R, 77 R, 174/84 R, 88 R, 91, 92, 93, 138 F, DIG. 8; 277/5, 12, 22, 26, DIG. 6

[56] References Cited

U.S. PATENT DOCUMENTS 3,576,937   5/1971   Eldridge, Jr. ........................ 174/92

FOREIGN PATENT DOCUMENTS 2,209,629   9/1973   Germany ............................. 174/92

*Primary Examiner*—Laramie E. Askin
*Attorney, Agent, or Firm*—Lyon & Lyon

[57] ABSTRACT

A splice case is disclosed providing sealed protection for splices such as in telephone cable situated in adverse environmental conditions. The case includes a shell defining a cavity for enclosure of a splice. The shell is longitudinally split and includes openings at the ends thereof along the longitudinal split for receiving incoming cable. Thermally responsive sealant extends along the longitudinal split and a heating element is provided for causing the sealant to effectively seal the enclosed splice. A multiple cable adapter of thermally responsive sealant is sized to fit within a cable opening in the splice case and includes a plurality of longitudinally extending channels for accommodation of multiple incoming cables. Sheets of material exhibiting high thermal conductivity extend from the adapter such that the heat of the heating elements may be conveyed to the body of the adapter.

10 Claims, 7 Drawing Figures

MULTIPLE CABLE ADAPTER AND SPLICE CASE INCLUDING THE SAME

CROSS-REFERENCE TO RELATED APPLICATIONS

This application is related to and expressly incorporates by reference the disclosures in Horsma, et al. "Heat Recoverable Self-Heating Sealing Article and Method of Sealing a Splice Therefrom", Ser. No. 601,344, filed Aug. 4, 1975; Horsma, et al. "Layered Self-Regulating Heating Article", Ser. No. 601,638, filed Aug. 4, 1975; Horsma, et al., "Positive Temperature Coefficient of Resistance Compositions", Ser. No. 601,639, filed Aug. 4, 1975; Horsma, et al. "Self-Heating Article With Fabric Electrodes", Ser. No. 601,549, filed Aug. 4, 1975, now abandoned in favor of continuation application Ser. No. 735,958, filed Oct. 27, 1976; De-Groef, "Heat Recoverable Article", Ser. No. 611,490, filed Sept. 18, 1975, now abandoned; and Diaz, "Pressurized Splice Case", Ser. No. 638,687, filed Dec. 8, 1975, now abandoned in favor of continuation-in-part application Ser. No. 786,835, filed Apr. 12, 1977, all of which have the same assignee as the present invention.

BACKGROUND OF THE INVENTION

The present invention is directed to a multiple cable adapter in a splice case employing thermally responsive sealant.

In communication systems and the like, cables are often employed which include a large number of conductors encased in a protective outer sheet. These cables must be periodically spliced to connect succeeding portions of cables and to provide access to the cable for branch cables, terminals and the like. At a splice in such cables, the protective sheets must be disturbed. This provides an opportunity for moisture and other environmental elements to reach and destroy the unprotected conductors and splice. Consequently, splice cases have been developed which operate to seal the unprotected splice and cable ends.

Such splice cases often employ mastics, sealants and complex mechanical structures as a means for preventing damaging environmental intrusion. However, the nature of the splice cases themselves and the level of skill required in assembling these splice cases have resulted in marginally acceptable performance levels for such systems. However, increasing performance demands, lack of installer skill, product anomalies and other errors have been found to create serious performance problems with such splice case systems. To overcome these deficiencies, such communications systems have employed grease packing or pressurized gas to prevent environmental intrusion through small leaks. Repair must be made as these leaks expand.

In Diaz, "Pressurized Splice Case", Ser. No. 638,687, filed Dec. 8, 1975, now abandoned in favor of continuation-in-part application Ser. No. 786,835, filed Apr. 12, 1977, a splice case is provided which employs thermally responsive sealant on the seams of a longitudinally split shell with an integral heating element or elements for causing the sealant to unify the portions of the shell. Because of the integral heating unit, substantially unskilled workers are able to assemble the case about a splice and obtain excellent results. However, conventional techniques are still relied on for the placement of multiple cables in any one end opening in the case. Therefore, operator skill is relied on to a certain extent when multiple cables are to be employed with a single end opening of the case.

SUMMARY OF THE INVENTION

The present invention is directed to a splice case which has the capability of accepting multiple cables in any one end opening in the case without requiring extensive installer fabrication of an end seal. The splice case includes a longitudinally split shell having heaters located therein with heat responsive sealant disposed along the longitudinal split. Upon assembly of the case around a splice, the heaters are activated and the thermally responsive sealant will become sealed along and preferably integrally bonded across the longitudinal split in the shell.

To accommodate multiple cables through a single end opening in the splice case, an adapter is provided which also comprises thermally responsive sealant. The adapter includes longitudinal channels therethrough for the receipt of incoming cables and has thermally conductive sheets which can be positioned to extend to locations near the heaters located in the case. Thus, activation of the heaters located within the splice case will simultaneously cause the sealant along the longitudinal split and the adapter to form a seal and preferably an integral bond for the shell and incoming cables.

The incorporation of the adapter of thermally responsive sealant substantially reduces reliance on installer skill and component uniformity and tolerance control. Multiple incoming cables can be easily and quickly associated with an adapter which is placed in an end opening of the shell without any attention whatsoever to fit or avoidance of interstices. The thermally responsive nature of the adapter and/or sealant is able to overcome significant anomalies in component fit and adapter and cable placement. Compatibility of the adapter of thermally responsive sealant with the splice case having integral heating elements and thermally responsive sealant along the longitudinal split of the shell could only be reached by a uniform heating of sealant material, both in the thin sheets associated with the longitudinal split of the splice case and in the thicker section of the adapter. To accomplish this, thermally conductive sheets extending from positions near the embedded heating elements to the center portions of the adapter was found to provide sufficient heat transfer to effect fusing of the adapter body to overcome any anomalies in the splice case components or assembly and properly seal multiple incoming cables with the adapter to the surrounding shell. The thermally conductive sheets act to convey heat during final assembly of the case and then remaining inactive within the case, embedded within the solidified sealant, until separation of the case is desired. A reactivation of the embedded heaters will again cause sufficient fusion of the material to allow separation of the case. The sheets, embedded within the assembled case, do not affect the performance of the case. Instead they only operate during assembly and disassembly of the case to overcome any significant installer error and component anomaly to provide a splice case capable of withstanding the physical requirements to which such splice cases are routinely exposed.

Accordingly, it is an object of the present invention to provide an improved splice case for multiple input cables.

It is another object of the present invention to provide an adapter to accommodate multiple input cables to a single splice case opening.

A further object of the present invention is to provide an improved splice case for multiple input cables which is sealed by internal heating elements to provide proper sealing of the splice case.

Other objects and advantages will appear hereinafter.

DETAILED DESCRIPTION OF THE PREFERRED EMBODIMENT

Figure 1:
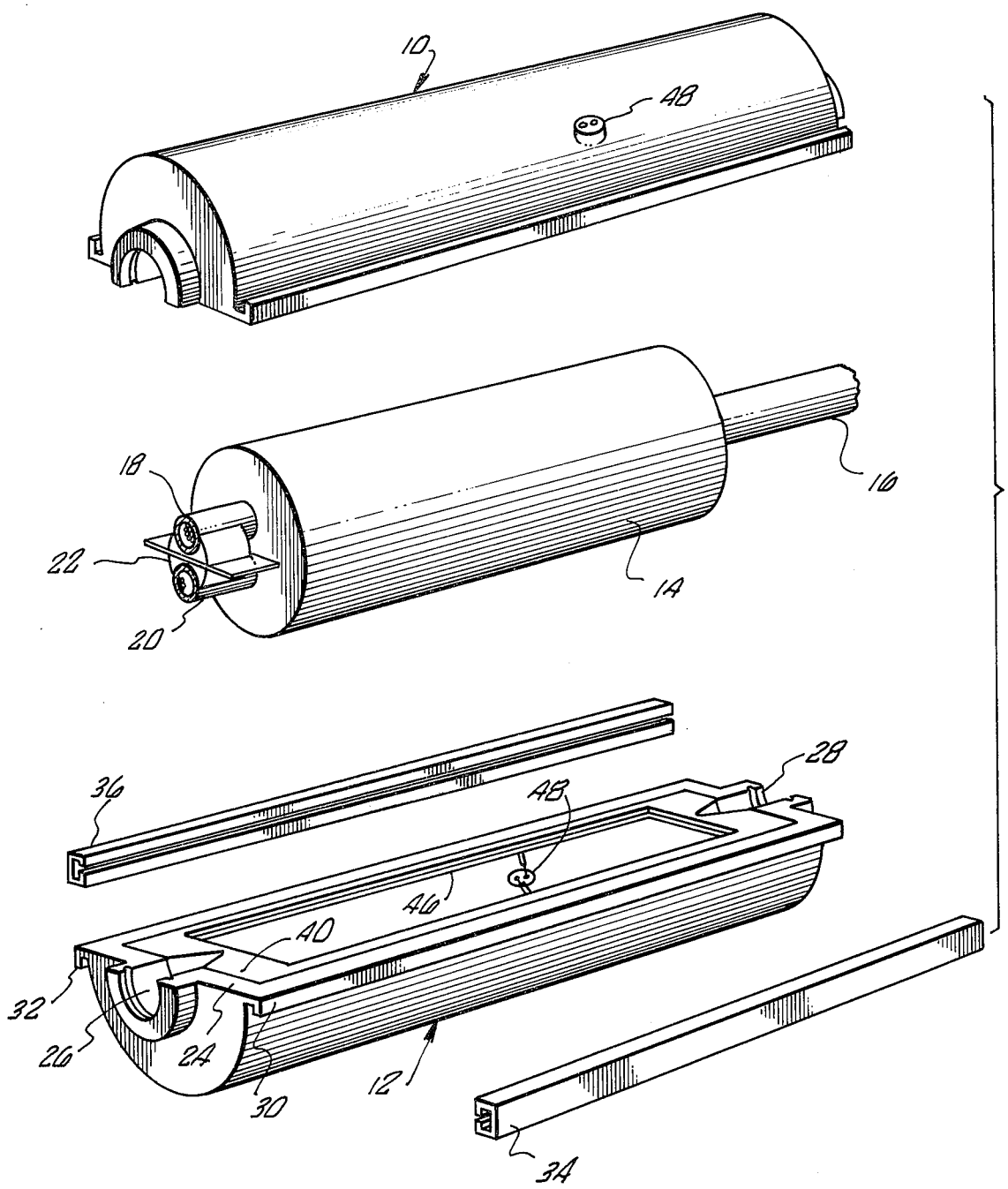
FIG. 1 is an exploded assembly view of the present invention.

Turning in detail to the drawings, FIG. 1 illustrates two case halves 10 and 12 prepared for assembly about a splice 14 shown without detail. A first cable 16 is shown entering the splice 14 at one end while two smaller cables 18 and 20 are shown entering the splice 14 at the other end thereof. Positioned between the smaller cables 18 and 20 is an adapter, generally designated 22. The adapter is provided in this instance to properly accommodate the two smaller cables 18 and 20 with the shell halves 10 and 12 which define a single access at one end of the case. Other embodiments employing multiple access passageways and multiple incoming cables may also be employed as would be obvious to one skilled in the art and as further developed in the following disclosure.

Figure 2:
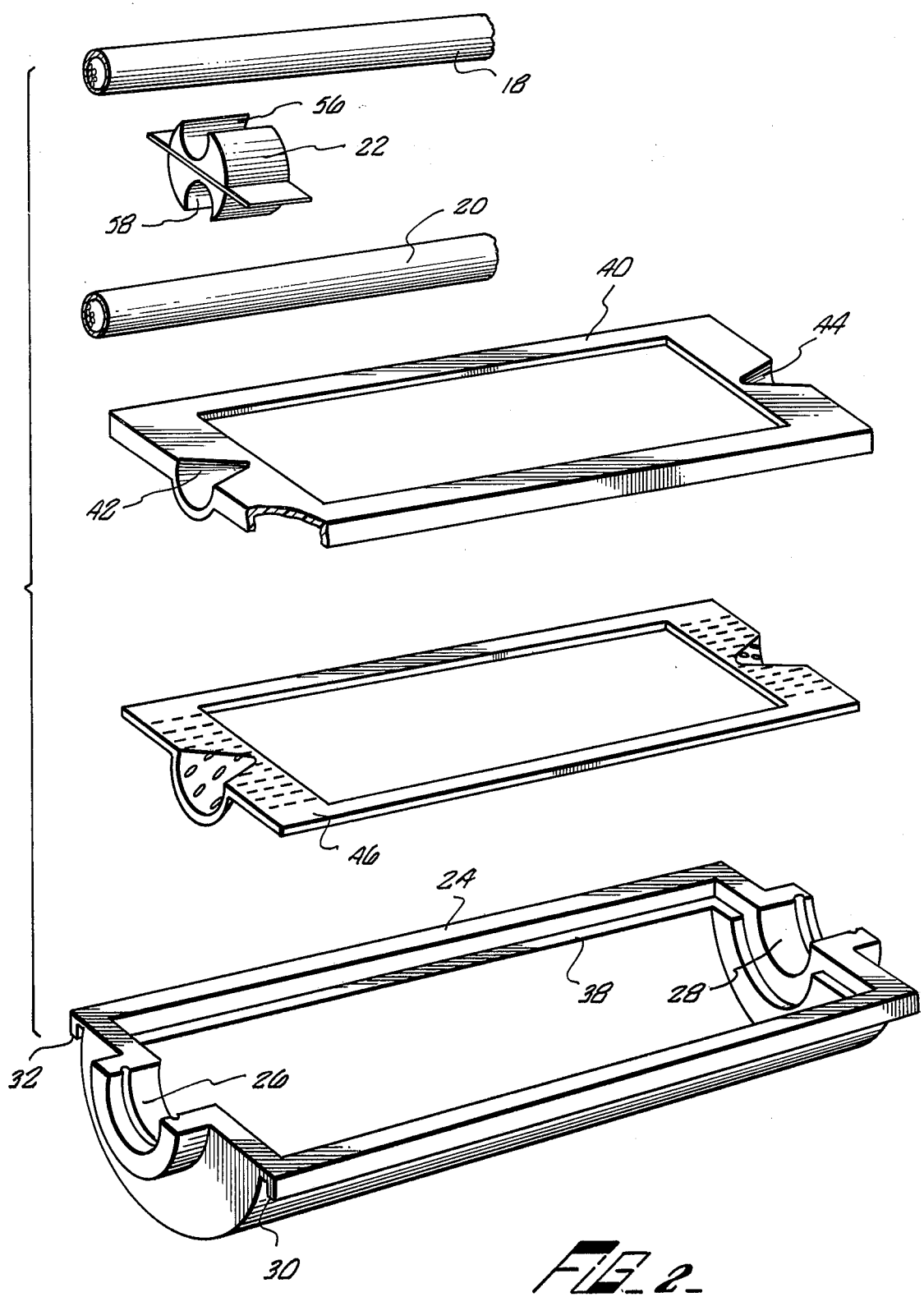
FIG. 2 is a detailed exploded assembly view illustrating the construction of a portion of the splice case.

Looking first to the case halves 10 and 12, the construction thereof is best seen in FIG. 2. In FIG. 2, the case half 12 is shown to include a substantially semi-cylindrical shell 24 which may be of any structural material capable of enduring the environment to which such a case will be exposed. Structural plastic of a high impact nature has found utility in such applications. The shell half 24 includes a semi-cylindrical cavity for receipt of the splice 14. Such splice cases are conveniently and traditionally cylindrical in shape; however, other shapes may be employed as may be required. At either end of the shell half 24 is an access channel 26 and 28 extending longitudinally into the cavity of the shell half 24. When the shell half 24 is associated with the other half of the case, the access channels 26 and 28 will form enclosed passageways leading into the cylindrical cavity of the case. Locking flanges 30 and 32 extend the length of each shell half 24 on either side thereof to accept the locking channels 34 and 36 as seen in FIG. 1. A ledge 38 is provided within the shell half 24 to position the sealing means.

The present invention contemplates the use of a thermally responsive sealant as a means for preventing environmental intrusion into the splice case. To conveniently provide such a thermally responsive sealant in the case without relying on the installers' skill and attention to duty, a sealing member 40 is provided. The sealing member 40 is sized to fit on the ledge 38 in each semi-cylindrical shell 24. Preferably, the sealing member 40 is comprised of a layer of resilient polymer composition, i.e., one that will both accommodate and recover from a deformation, and a layer of thermally responsive sealant, which, when heated, acts to bond the shell members together.

Suitable sealant materials which are thermally responsive may be selected from a number of compositions. Thermosetting or glassy polymeric compositions may be employed. However, it is presently preferred to use thermoplastic or hotmelt type adhesives. When thermoplastic adhesives are used, a sealed splice case can be reentered for repair or other reason simply by reheating the bond to cause the adhesive to soften for separation of the shells. Particularly suited hotmelt adhesives are ones that will become tacky above their melting point without significant flow. Adhesives meeting these criteria include those disclosed in application for U.S. Patent of Lopez, et al, "Hotmelt Adhesive", Ser. No. 492,722, filed July 29, 1974, (now U.S. Pat. No. 4,018,733) having the same assignee as the present invention. The disclosure of this application is incorporated herein by reference.

The resilient layer of the sealing member 40 can be fabricated from a variety of polymer compositions. Among suitable polymers will be elastomers of relatively high ultimate elongation, preferably up to about 200% at the temperature at which the adhesive or sealant is activated. This temperature will be elevated above ambient when a hotmelt adhesive is employed. Preferred polymers are those capable of being rendered heat recoverable. For these polymers, the ultimate elongation should be measured at the higher of the recovery temperature of the polymer or the temperature at which the adhesive is activated. A heat recoverable polymer may be defined as one which upon the application of heat alone may recover from a deformed configuration to an original configuration. Polymers capable of being rendered heat recoverable include crosslinked crystalline polymers. Crosslinking of such polymers may be by chemical means, for example, by using peroxide initiators, or by exposing the polymer to ionizing radiation. The latter process is described in Cook, U.S. Pat. No. 3,086,242, the disclosure of which is incorporated herein by reference. Suitable crystalline polymers are well known to those skilled in the art and representative ones are enumerated in the aforementioned Cook Patent. One suitable polymer composition capable of being rendered heat recoverable and used in the present invention comprises (by weight) a mixture of 88% ethylene-ethyl acrylate copolymer, 9% pigment, and 3% finely divided silica.

The sealing member 40 is provided in this embodiment with a semiconical notch 42 and 44 at either end thereof. These notches define openings into the splice case and are positioned in the access channels 26 and 28 of the shells 24. Because of the resilient nature of the sealing member 40, it may be heated and distorted at the conical notches to a cylindrical shape for easy placement of incoming cables. Upon heating and sealing of the case, the sealing member 40 will attempt to recover to its original conical shape and will thus tightly enclose an incoming cable or an adapter such as will be disclosed below.

To activate the thermally responsive sealant, an expandable electrical heating element 46 is positioned on the underside of the sealing member 40 in each semi-cylindrical shell 24. The preferred construction for this element is described in detail in application for U.S. Patent to Diaz, "Expandable Heater", Ser. No. 638,440, filed Dec. 8, 1975, now abandoned, having the same assignee as the present invention. The heater 46 is shown in its overall appearance prior to being bonded to the sealing member 40 and positioned in the semi-cylindrical shell 24. Preferably, the heater is one that is self-regulating as to its maximum temperature. Electrical access to the heating element 46 is provided at the electrical coupling points 48.

Figure 3:
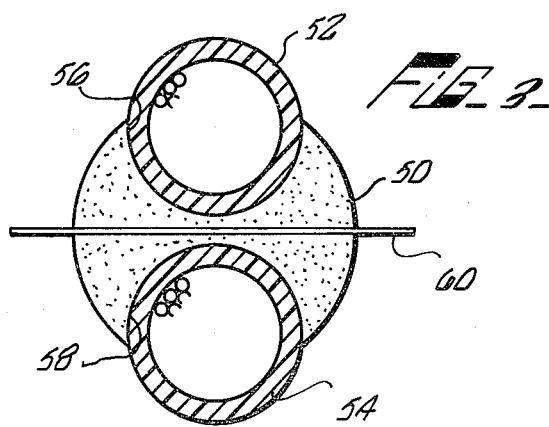
FIG. 3 is a cross sectional end view of multiple cables positioned in an adapter of the present invention.

For convenience and economic efficiency, it is advantageous to have a rather standardized splice case which is sufficiently versatile to handle a wide range of in-coming cables. However, conventional designs would require additional installer skill and additional operations in bundling and sealing a plurality of in-coming wires through a single access passageway into a splice case. By the present invention, adapters are provided to accommodate a plurality of cables through a single access opening in the splice case without significantly increasing the need for further installment operations or greater installer skill. Several embodiments of such adapters made according to the present invention are illustrated in FIGS. 3 through 7. The adapter 50 illustrated in FIG. 3 is of thermally responsive material and preferably is of a polyethylene copolymer based adhesive rubber. This material is susceptible to being heated to a melt point where it maintains substantial structure but is also capable of bonding with associated cables, the splice case and the sealing members 40. In order to accommodate two cables 52 and 54, longitudinal channels extending the length of the adapter and which have a diameter sufficient to receive the cables are provided. Such an adapter is also shown in FIG. 2 where the channels 56 and 58 can be seen.

The nature of the splice case as employed in the present invention includes the electrical heating elements 46 as discussed above. These heating elements 46 are capable of heating the sealing member 40 and are also capable of heating the adapter 50. However, the proximity of the sealing member 40 and its overall thickness facilitate the heating thereof while the thick nature of the adapter 50 and its location relative to the heating elements 46 inhibit efficient heating thereof. To employ the heat from the heating element 46 for properly elevating the temperature of the adapter 50, a plate 60 is molded through the center of the adapter 50. This plate may be of copper or aluminum such that it will convey heat quickly into the interior of the adapter 50. It has been found that a plate having a thickness of 0.010 inch (0.025 cm) is sufficient. The plate 60 extends the length of the adapter 50 and extends laterally from the adapter to locations proximate to the heating elements 46. Thus, when the case is assembled and electricity is applied to the heating elements 46, the sealing member 40 and the adapter 50 will be heated to provide a bond with the cables and the case to completely seal the enclosed splice. This is all accomplished with a minimum of installer skill and assembly steps.

Figure 4:
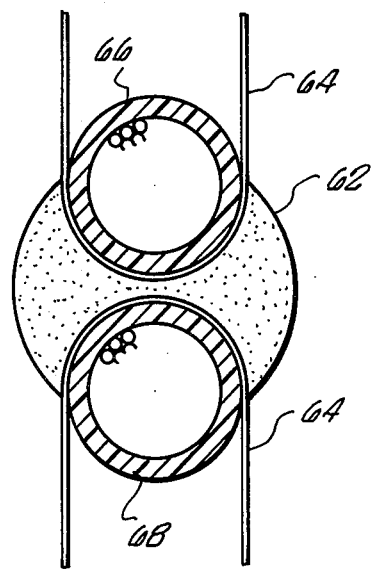
FIG. 4 is a cross sectional end view of another adapter embodiment.
Figure 5:
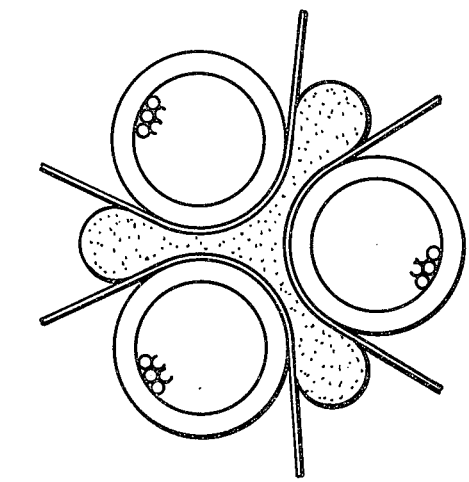
FIG. 5 is an end cross section of a third adapter embodiment.
Figure 6:
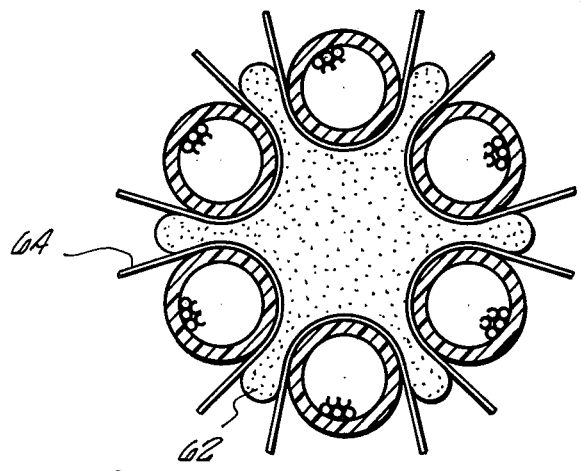
FIG. 6 is a cross sectional end view of an adapter embodiment showing a large number of cables.
Figure 7:
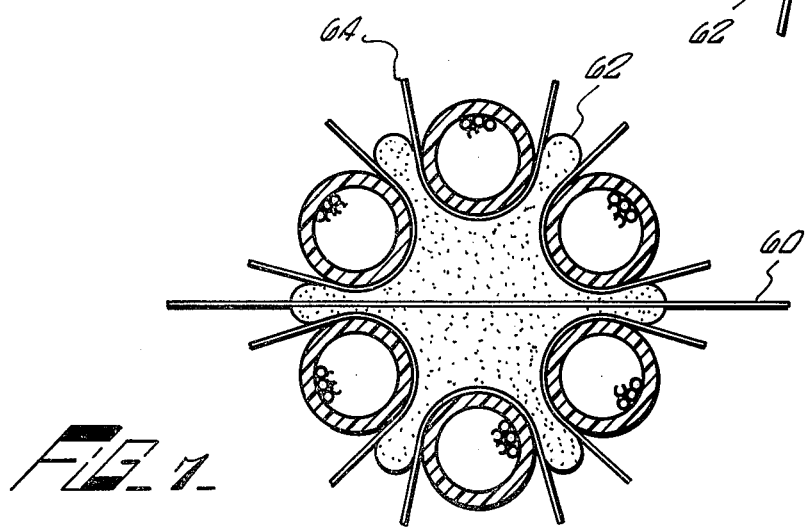
FIG. 7 is an end view of an embodiment similar to that of FIG. 6 with an additional thermally conductive sheet.

Other embodiments of the present invention are shown in FIGS. 4 through 7 where foil is provided for conveying heat to the respective adapter. In FIG. 4, an adapter 62 is provided with foil sheets 64 bonded within the longitudinal channels of the adapter. In this instance, a plate extending through the adapter is not provided. The foil sheets 64 are simply wrapped about the cables 66 and 68 such that they will approach the heating elements 46 of the case. In order that bonding will occur with the cables 66 and 68, the foil sheets 64 have a layer of adhesive on the inner side thereof. A foil of 0.002 inch (0.005 cm) has been found satisfactory. FIGS. 5, 6 and 7 show increased numbers of in-coming cables and channels for the receipt thereof. Furthermore, in FIG. 7, both foil about the cables and a plate through the center of the adapter are provided.

Those skilled in the art will realize that provided at least a portion of the adapter is thermally responsive at the sealing temperature of the splice case, a wide variety of materials or combinations of materials may be used therefor. Thus, a glassy material which becomes thermally responsive at the sealing temperature of the case or a combination of a glassy or crystalline material with a thermally responsive coating sufficiently thick to accommodate the cables inserted therein would be amongst those suitable in the practice of this invention.

Thus, an improved splice case is provided which, through the use of the thermally responsive adapter, provides for a wide variety of in-put cable configurations. This increased capacity is accomplished without significant increase in installer skill or assembly steps. While embodiments and applications of this invention have been shown and described, it would be apparent to those skilled in the art that many more modifications are possible without departing from the inventive concepts herein described. The invention, therefore, is not to be restricted except by the spirit of the appended claims.

What is claimed is:

1. A splice case comprising
a shell defining a cavity therein for enclosing a splice, said shell including a longitudinal split and having an opening at one end thereof along said longitudinal split to receive in-coming cable;
a thermally responsive sealant positioned along said longitudinal split;
a heating element positioned in said shell along said longitudinal split, said thermally responsive sealant being outwardly of said heating element to seal said shell upon heating of said heating element; and
an adapter of thermally responsive sealant sized to fit in said opening, said adapter having a plurality of channels extending the length of said adapter for receipt of cables extending into said shell and a sheet exhibiting high thermal conductivity extending from said insert into said split in said shell for heat conduction from said heating element to said adapter.

2. The splice case of claim 1 wherein said sheet is a plate extending centrally through the body of said adapter and extending laterally therefrom.

3. The splice case of claim 1 wherein said sheet is a foil of thermally conductive material positioned within one of said plurality of channels and extending outwardly therefrom.

4. The splice case of claim 3 wherein said foil includes a layer of heat responsive sealant on a first side thereof, said foil being bonded to said adapter on the other side thereof.

5. The splice case of claim 1 wherein said adapter is of polyethylene copolymer based adhesive rubber.

6. An adapter for sealing a plurality of cables in an access opening of a splice case, comprising
a body of hot melt sealant sized to fit in the access opening of the splice case, said body having a plurality of channels extending the length thereof for receipt of cables extending to the splice case, and a sheet exhibiting high thermal conductivity extending from said body outwardly to enhance thermal conductivity between the splice case and said body.

7. The adapter of claim 6 wherein said sheet is a plate extending centrally through the body of said adapter and extending laterally therefrom.

8. The splice case of claim 7 further including a foil positioned in each of said plurality of channels and extending outwardly therefrom.

9. The adapter of claim 6 wherein said sheet is a foil of thermally conductive material positioned within one of said plurality of channels and extending outwardly therefrom.

10. The adapter of claim 6 wherein said body is of polyethylene copolymer based adhesive rubber.

* * * * *